(12) United States Patent
Freire et al.

(10) Patent No.: US 11,863,114 B2
(45) Date of Patent: Jan. 2, 2024

(54) HARMONIC DIRECT TORQUE CONTROL OF AN ELECTRIC MACHINE

(71) Applicant: Siemens Gamesa Renewable Energy A/S, Brande (DK)

(72) Inventors: Nuno Miguel Amaral Freire, Brande (DK); Zhan-Yuan Wu, Sheffield (GB)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 165 days.

(21) Appl. No.: 17/606,466

(22) PCT Filed: Apr. 17, 2020

(86) PCT No.: PCT/EP2020/060832
§ 371 (c)(1),
(2) Date: Oct. 26, 2021

(87) PCT Pub. No.: WO2020/224932
PCT Pub. Date: Nov. 12, 2020

(65) Prior Publication Data
US 2022/0200495 A1    Jun. 23, 2022

(30) Foreign Application Priority Data
May 6, 2019    (EP) .................................... 19172845

(51) Int. Cl.
*H02P 9/10*    (2006.01)
*H02P 9/02*    (2006.01)

(52) U.S. Cl.
CPC . *H02P 9/10* (2013.01); *H02P 9/02* (2013.01)

(58) Field of Classification Search
CPC .................................... H02P 9/10; H02P 9/02
See application file for complete search history.

(56) References Cited

U.S. PATENT DOCUMENTS

| | | |
|---|---|---|
| 2014/0021894 A1 | 1/2014 | Simili |
| 2019/0273457 A1 | 9/2019 | Deng et al. |

FOREIGN PATENT DOCUMENTS

| | | |
|---|---|---|
| DE | 102016217887 A1 | 3/2018 |
| EP | 2043255 A2 | 4/2009 |

(Continued)

OTHER PUBLICATIONS

Abosh Atheer H et al: "Reduction of Torque and Flux Ripples in Space Vector Modulation-Based Direct Torque Control of Asymmetric Permanent Magnet Synchronous Machine", IEEE Transactions on Power Electronics, Institute of Electrical and Electronics Engineers, USA, vol. 32, No. 4, pp. 2976-2986, XP011639825, ISSN: 0885-8993, DOI: 10.1109/TPEL.2016.2581026; [retrieved on Jan. 23, 2017]; the whole document; 2017.

(Continued)

*Primary Examiner* — Robert L Deberadinis
(74) *Attorney, Agent, or Firm* — Schmeiser, Olsen & Watts LLP

(57) ABSTRACT

Provided is a method of generating a converter control signal for a generator side converter portion, in particular of a wind turbine, being coupled to a generator, in particular a permanent magnet synchronous machine, the method including: deriving at least one harmonic torque reference, in particular based on a harmonic torque demand and/or a torque indicating feedback signal; deriving at least one harmonic flux reference, in particular based on a harmonic stator voltage demand and/or a stator voltage indicating feedback signal; adding all of the at least one harmonic torque reference to a fundamental torque reference and subtracting an estimated generator torque to derive a torque error; adding all of the at least one harmonic flux reference to a fundamental flux reference and subtracting an estimated generator flux to derive a flux error; and deriving the converter control signal based on the torque error and the flux error.

15 Claims, 7 Drawing Sheets

(56) References Cited

FOREIGN PATENT DOCUMENTS

| EP | 2169821 A1 | 3/2010 |
|----|------------|--------|
| EP | 2485388 A1 | 8/2012 |
| EP | 2750270 A1 | 7/2014 |
| EP | 3297156 A1 | 3/2018 |
| EP | 3264593 B1 | 10/2018 |
| WO | WO 2018050458 A1 | 3/2018 |

OTHER PUBLICATIONS

Gundavarapu Akhila et al: "Direct Torque Control Scheme for DC Voltage Regulation of the Standalone DFIG-DC System", IEEE Transactions on Industrial Electronics, IEEE Service Center, Piscataway, NJ, USA, vol. 64, No. 5, pp. 3502-3512, XP011645435, ISSN: 0278-0046, DOI: 10.1109/TIE.2016.2644623; [retrieved on Apr. 10, 2017]; equation 2,5; Figures 4,6.7; 2017.

Zhongqi Wan et al: "A novel torque ripple reduction strategy for predictive direct torque controlled PMSG", Electrical Machines and Systems (ICEMS), 2012 15th International Conference on, IEEE, pp. 1-5, XP032298278, ISBN: 978-1-4673-2327-7 paragraph [OIII]; 2012.

Zhang Zhe et al: "A Discrete-Time Direct Torque Control for Direct-Drive PMSG-Based Wind Energy Conversion Systems", IEEE Transactions on Industry Applications, IEEE Service Center, Piscataway, NJ, US, vol. 51, No. 4, pp. 3504-3514, XP011663225, ISSN: 0093-9994, DOI: 10.1109/TIA.2015.2413760; [retrieved on Jul. 15, 2015]; the whole document; 2015.

European Search Report dated Oct. 28, 2019 for application No. 19172845.0.

International Search Report dated Jul. 10, 2020 for application No. PCT/EP2020/060832.

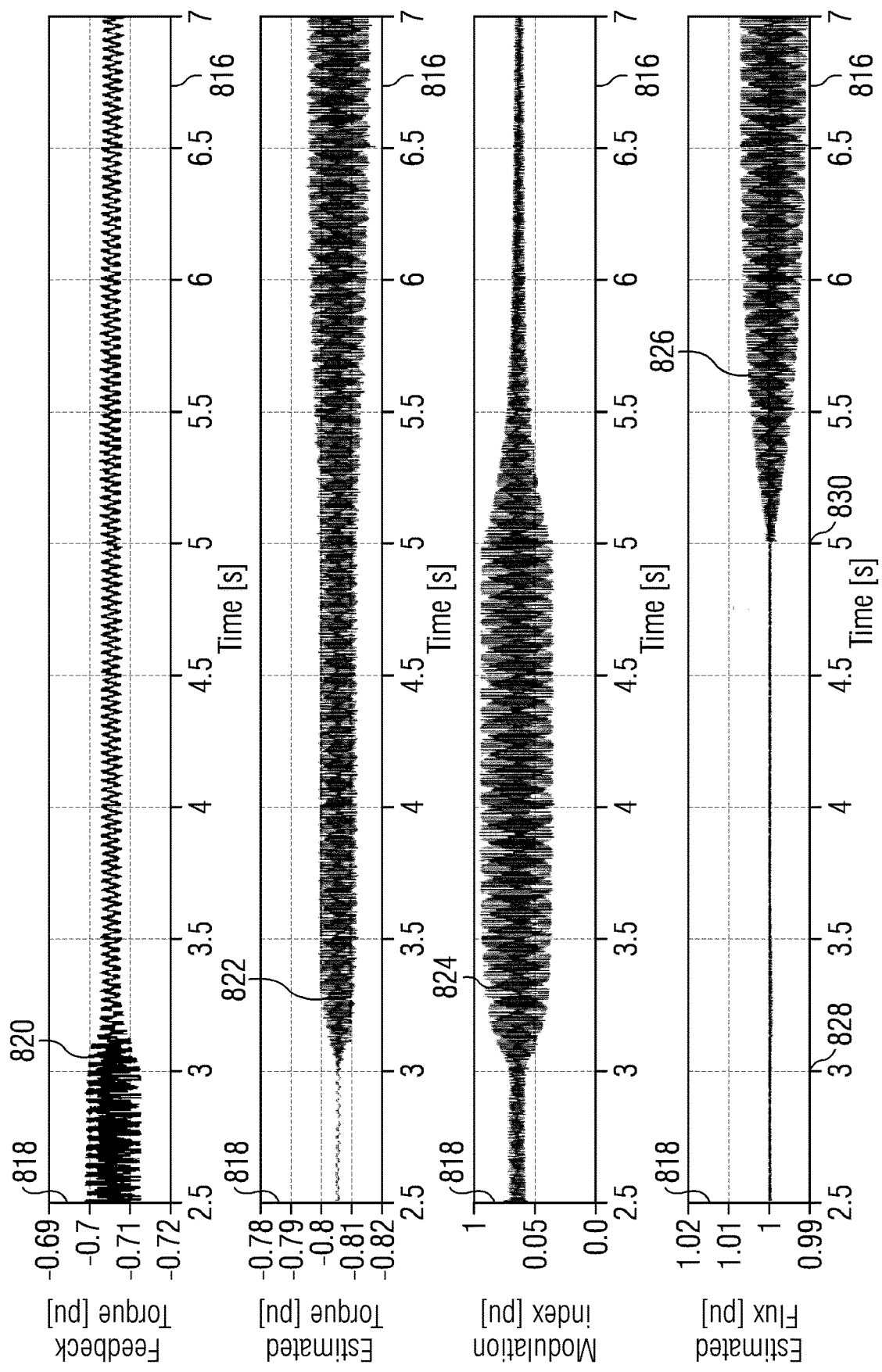

HARMONIC DIRECT TORQUE CONTROL OF AN ELECTRIC MACHINE

CROSS-REFERENCE TO RELATED APPLICATIONS

This application claims priority to PCT Application No. PCT/EP2020/060832, having a filing date of Apr. 17, 2020, which claims priority to EP Application No. 19172845.0, having a filing date of May 6, 2019, the entire contents both of which are hereby incorporated by reference.

FIELD OF TECHNOLOGY

The following relates to a method and to an arrangement of generating a converter control signal for a generator side converter portion, in particular of a wind turbine, being coupled to a generator. Further, the following relates to a power generation system comprising the arrangement as well as at least one generator and at least one converter.

BACKGROUND

When operating a generator for example of a wind turbine, in particular a permanent magnet synchronous machine, undesired harmonics of a fundamental electric frequency disturb an efficient operation. The prior art discusses harmonic control for vector control drives.

Concerning torque ripple control in control of electrical machines with DTC (Direct Torque Control), prior art addresses mainly estimation of electromagnetic torque, aiming to improve estimation accuracy by more complex/accurate machine models and respective torque equations. These presumably high-fidelity models require a large number of parameters, which depend on load/saturation and rotor position and are difficult to measure/estimate. Therefore, conventional methods apply a number of simplifications for implementation and tuning, for instance, neglecting given parameters and/or load variation in given operating ranges. As feedback source an accelerometer located in the stationary ring of the generator main bearing has been used. Conventional harmonic control in FOC (Field Oriented Control) is largely based on Id and Iq currents.

However, it has been observed that the reduction of harmonics is not satisfactory when conventional methods are applied.

Thus, there may be a need for a method and an arrangement of generating a converter control signal for a generator side converter portion, wherein harmonic control is improved. Furthermore, there may be a need for a method of controlling at least one generator side converter portion in which the converter control signal is generated according to a method according to an embodiment of the present invention and is supplied to a respective converter or generator side converter portion.

SUMMARY

An aspect relates to a method of generating a converter control signal for a generator side converter portion, in particular of a wind turbine, being coupled to a generator, in particular a permanent magnet synchronous machine, the method comprising: deriving at least one harmonic torque reference (e.g., Th*), in particular based on a harmonic torque demand and/or a torque indicating feedback signal (e.g., Fb); deriving at least one harmonic flux reference (e.g., psih*), in particular based on a harmonic stator voltage demand and/or a stator voltage indicating feedback signal (e.g., Vrms); adding all of the at least one harmonic torque reference (e.g., Th*) to a fundamental torque reference (e.g., Te*) and subtracting an estimated generator torque (e.g., Teˆ) to derive a torque error; adding all of the at least one harmonic flux reference (e.g., psih*) to a fundamental flux reference (e.g., psis*) and subtracting an estimated generator flux (e.g., psisˆ) to derive a flux error; and deriving the converter control signal (e.g., Sabc) based on the torque error and the flux error.

The method may be implemented in software and/or hardware. The method may in particular be performed by a wind turbine controller or in general a converter controller controlling the generator side converter portion which is coupled to the generator.

The converter control signal may for example define a switching state of plural controllable switches which are comprised in the generator side converter portion. The converter control signal may comprise pulse width modulation (PWM) signals. The method may be applicable to any number of harmonics, one or more i.e., multiples of a fundamental electrical frequency. Thus, the method may be applied in parallel to several different harmonics of a fundamental electric frequency.

The harmonic torque reference may be derived by a torque ripple controller (TRC). The harmonic torque reference may be derived such that when the converter portion is supplied with the respective converter control signal, the torque complies with the harmonic torque demand which may for example be zero for one or more harmonics. The torque indicating feedback signal may comprise for example a sensor signal, such as derived from an accelerometer or a microphone, or a strain gauge.

The harmonic flux reference may for example be derived by a harmonic voltage controller (HVC). The harmonic flux reference may be derived such that the stator voltage complies with the harmonic stator voltage demand. The flux may relate to the magnetic flux of magnetic fields through the coils of the generator. The flux includes the flux generated by the permanent magnet and the flux generated by the armature reaction.

The fundamental torque reference may relate to a desired dc torque. The fundamental flux reference may relate to a desired flux at the fundamental frequency when observed in the stationary reference frame, i.e., stator flux.

The desired torque change as well as the desired flux change may be supplied as inputs to a switching table which may output a switching state, as an example of the converter control signal. According to an embodiment of the present invention, the converter control signal represents a switching state signal defining a switching state of plural controllable switches of the generator side converter portion.

The switching state signal may define which of the controllable switches comprised in the generator side converter portion are to be in a conducting state or in a non-conducting state. Thereby, conventional control methods for a converter portion are supported. The method may for example support a three-phase permanent magnet generator being coupled to the generator side converter portion. For each phase, the converter portion may comprise two controllable switches connected in series.

According to an embodiment of the present invention, the stator voltage indicating feedback signal (e.g., Vrms) is derived from a measured DC-link voltage (e.g., Vdc) and the switching state, in particular involving applying an adaptive band pass filter tuned to the harmonic at interest. The reconstructed stator voltage is used in the case when reference voltages (or demand voltages) are not directly available.

A power generation system may comprise, beside the generator and the generator side converter portion also a DC link and a grid side converter portion. The generator side converter portion may substantially be adapted to convert a variable frequency AC power stream to a substantially DC power stream at the DC link. The grid side converter portion may be configured for converting the DC power stream to a substantially fixed frequency AC power stream. From the DC link voltage and the switching state, the stator voltage may be estimated. Thereby, a simple stator voltage indicating feedback signal may be provided.

According to an embodiment of the present invention, the torque error and the flux error are supplied to respective hysteresis controllers whose outputs (i.e., the desired torque change and flux change) are supplied to a switching table that outputs the switching state, wherein the switching table in particular outputs the switching state further based on a stator flux position (e.g., θpsis).

The hysteresis controller may output plus or minus one or plus or minus a constant depending on whether the input exceeds a first threshold or is below a second threshold. The hysteresis controllers may also be referred to as a bang-bang controller. Thereby, a simple manner for deriving the switching state may be provided.

According to an embodiment of the present invention, the torque error and the flux error (and in particular also total torque and flux references as well as stator voltage and currents) are both supplied to a predictive torque control, in particular including model-based prediction and cost function minimization, that derives the switching state.

According to an embodiment of the present invention, the torque error is supplied to a torque controller, and in particular also to a harmonic torque controller (e.g., HTC) in parallel, in particular operating in one or more reference frames, which derive a first voltage reference, wherein the flux error is supplied to a flux controller, and in particular also to a harmonic flux controller (e.g., HFC) in parallel, in particular operating in one or more reference frames, which derive a second voltage reference, wherein the converter control signal (e.g., Sabc) is derived based on the first voltage reference and the second voltage reference.

As the references for harmonic torque and harmonic flux are normally zero, the torque error and flux error to the harmonic controllers would be mostly derived from the harmonic feedbacks. For above both methods (i.e., hysteresis-based control and predictive control), the stator voltage indicating feedback signal (e.g., Vrms) is derived from a measured DC-link voltage (e.g., Vdc) and the switching state.

According to an embodiment of the present invention, the first voltage reference and the second voltage reference are both supplied to a dq-αβ-transformation module that outputs a total voltage reference (e.g., uab*), wherein the voltage reference (e.g., uab*) is supplied to a space vector modulator that derives the switching state signal (e.g., Sabc). Thereby, conventional methods may be supported and conventional calculation modules may be utilized.

According to an embodiment of the present invention, the stator voltage indicating feedback signal (e.g., Vrms) is derived from the total voltage reference (e.g., uab*, or udq*).

According to an embodiment of the present invention, the estimated generator torque (e.g Te^) and the estimated generator flux (e.g., psis^) are derived based on the stator voltage (e.g., vs), in particular reference stator voltage, and stator current (e.g., is), in particular measured.

A variety of flux/torque estimators may be employed, an example is given below:

$$\psi_{s\alpha} = \int_0^\tau (u_{s\alpha} - R_s i_{s\alpha})dt + \psi_{s\alpha|t=0}; \psi_{s\beta} = \int_0^\tau (u_{s\beta} - R_s i_{s\beta})dt + \psi_{s\beta|t=0}$$

$$T_e = \frac{3}{2}p(\psi_{s\alpha}i_{s\beta} - \psi_{s\beta}i_{s\alpha})$$

According to an embodiment of the present invention, the fundamental torque reference (e.g., Te*) and the fundamental flux reference (e.g., psis*) may be derived for example based on the stator voltage, in particular reference stator voltage, and/or stator current, in particular measured, and/or DC-link voltage.

According to an embodiment of the present invention, the torque indicating feedback signal (Fb) comprises a sensor measurement signal, in particular obtained by a torque sensor and/or a microphone, and/or an accelerometer. Thereby, the feedback signal may for example be bandpass-filtered to indicate the actual torque at the considered harmonic.

According to an embodiment of the present invention, the harmonic torque reference (Th*) may alternatively be derived from a look-up table based on an operating point of the generator, the operating point in particular defining rotational speed and power output. The operating point may for example be measured by measuring for example the rotational speed and the power output, and/or torque, etc.

According to an embodiment of the present invention it is provided a method of controlling at least one generator side converter portion, in particular of at least one wind turbine, being coupled to at least one generator, in particular a permanent magnet synchronous machine, the method comprising: performing a method of generating a converter control signal according to any one of the preceding embodiments; supplying the converter control signal to the generator side converter portion.

Thereby, the converter control signal is utilized for controlling the generator side converter portion. Thereby, torque and/or voltage ripples of the generator may be effectively reduced. For example, harmonic flux may be generated for voltage ripple reduction.

It should be understood that features, individually or in any combination, described, explained, provided or applied to a method of generating a converter control signal for a generator side converter portion are also, individually or in any combination, applicable to an arrangement for controlling a generator side converter portion according to an embodiment of the present invention and vice versa.

According to an embodiment of the present invention it is provided an arrangement for controlling a generator side converter portion, in particular of a wind turbine, being coupled to a generator, in particular a permanent magnet synchronous machine, the arrangement being adapted to carry out a method according to any one of the preceding embodiments.

Furthermore, according to an embodiment, it is provided a power generation system, in particular a wind turbine or a wind park, comprising: at least one generator, at least one converter comprising a generator side converter portion, a DC-link and a utility grid converter portion, the generator side converter portion being coupled to the generator; and at least one arrangement according to the preceding embodiment.

The aspects defined above and further aspects of embodiments of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Some of the embodiments will be described in detail, with reference to the following figures, wherein like designations denote like members, wherein:

FIG. 1 schematically illustrates a power generation system, here implemented as a wind turbine, according to an embodiment of the present invention;

FIG. 2 schematically illustrates an arrangement for controlling a generator side converter portion according to an embodiment of the present invention;

FIG. 3 schematically illustrates an arrangement for controlling a generator side converter portion according to an embodiment of the present invention;

FIG. 4 schematically illustrates an arrangement for controlling a generator side converter portion according to an embodiment of the present invention;

FIG. 8 illustrates simulation results.

DETAILED DESCRIPTION

Figure 1:
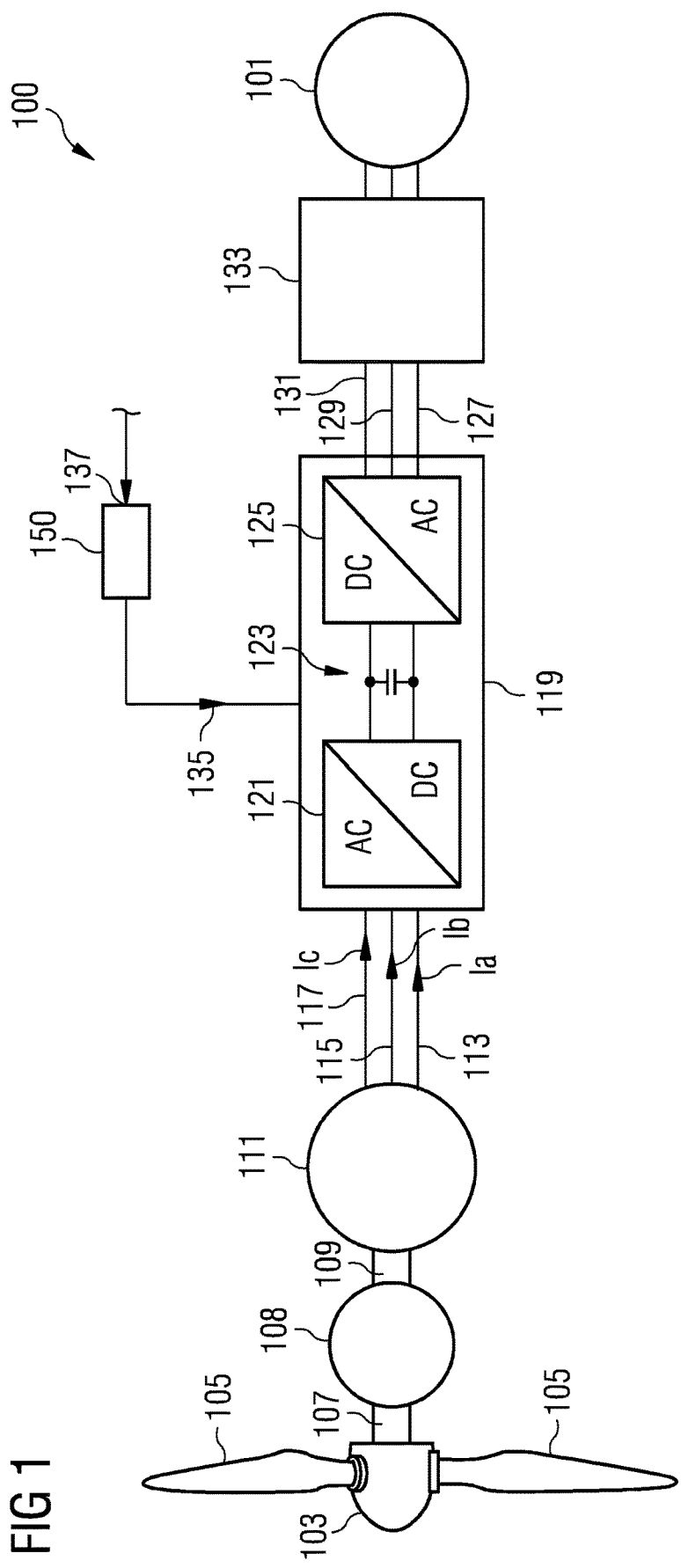

The illustration in the drawings is in schematic form. It is noted that in different figures, elements similar or identical in structure and/or function are provided with the same reference signs or with reference signs, which differ only within the first digit. A description of an element not described in one embodiment may be taken from a description of this element with respect to another embodiment.

FIG. 1 illustrates in a schematic form a wind turbine 100 according to an embodiment of the present invention as example of a power generation system, which provides electric energy to a utility grid 101.

The wind turbine comprises a hub 103 to which plural rotor blades 105 are connected. The hub is mechanically connected to a main shaft 107 whose rotation is transformed by a gear box 108 to a rotation of a secondary shaft 109, wherein the gear box 108 may be optional. The main shaft 107 or the secondary shaft 109 drives a generator 111 which may be in particular a synchronous permanent magnet generator providing a power stream in the three phases or windings 113, 115 and 117 to a converter 119 which comprises a generator side portion (AC-DC portion) 121, a DC-link 123 and a grid side portion (DC-AC portion) 125 for transforming a variable AC power stream to a fixed frequency AC power stream which is provided in three phases or windings 127, 129, 131 to a wind turbine transformer 133 which transforms the output voltage to a higher voltage for transmission to the utility grid 101.

The converter 119 is controlled via a converter control signal 135 which is derived and supplied from an arrangement 150 for controlling a generator side converter portion according to an embodiment of the present invention, which receives at least one input signal 137, such as one or more reference values or one or more quantities indicative of the operation of the generator 111 or any component of the wind turbine 100.

The generator in FIG. 1 comprises a single three-phase stator winding. Thereby, the winding 113 carries the stator current $I_a$, the winding 115 carries the stator current $I_b$ and the winding 117 carries the stator current $I_c$.

The arrangement 150 is adapted to counteract torque and voltage harmonics (for example a harmonic corresponding to six times the electrical frequency of the generator 111). The generator 111, the converter 119 and the arrangement 150 together form a generator system according to an embodiment of the present invention.

The arrangement 150 for controlling a generator side converter portion as included in the wind turbine power generation system 100 illustrated in FIG. 1 receives inputs signals 137 which may relate to stator voltage, stator current, may relate to a feedback signal, may relate to an operating point, as will be detailed with reference to FIGS. 2 to 4. The control signal 135 in particular is a converter control signal for controlling the generator side converter portion 121 of the converter 119.

Figure 2:
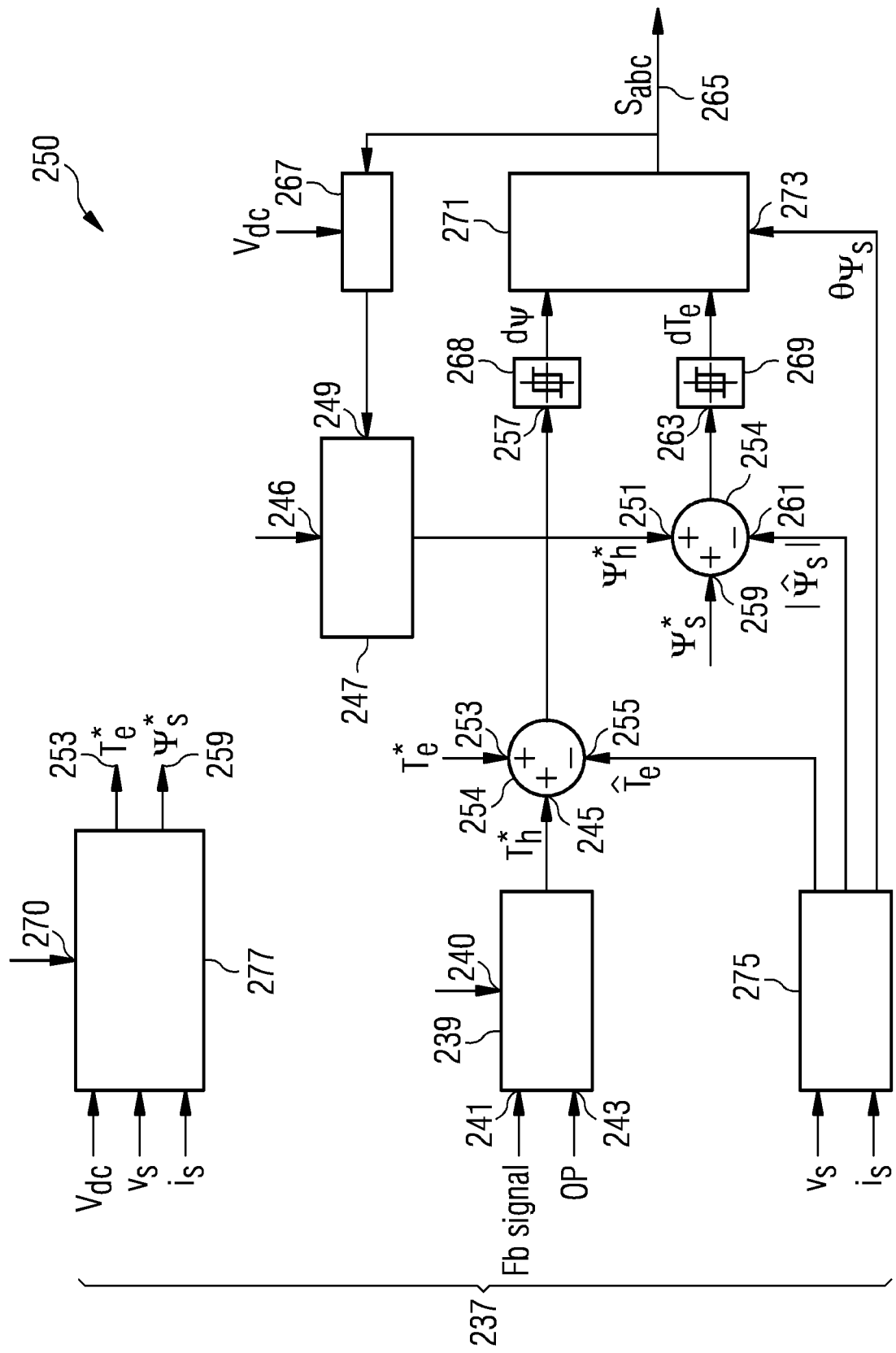
Figure 3:
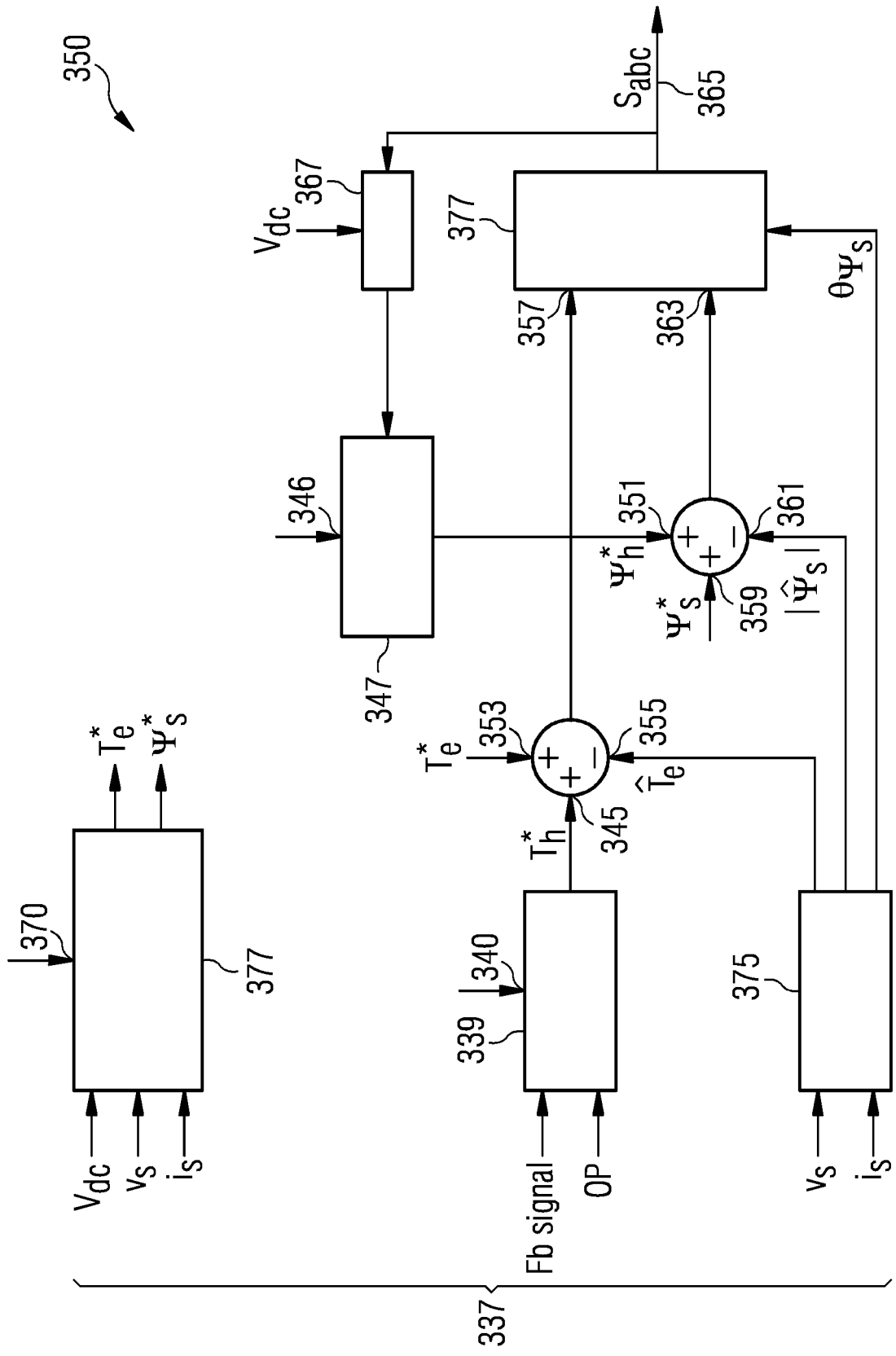
Figure 4:
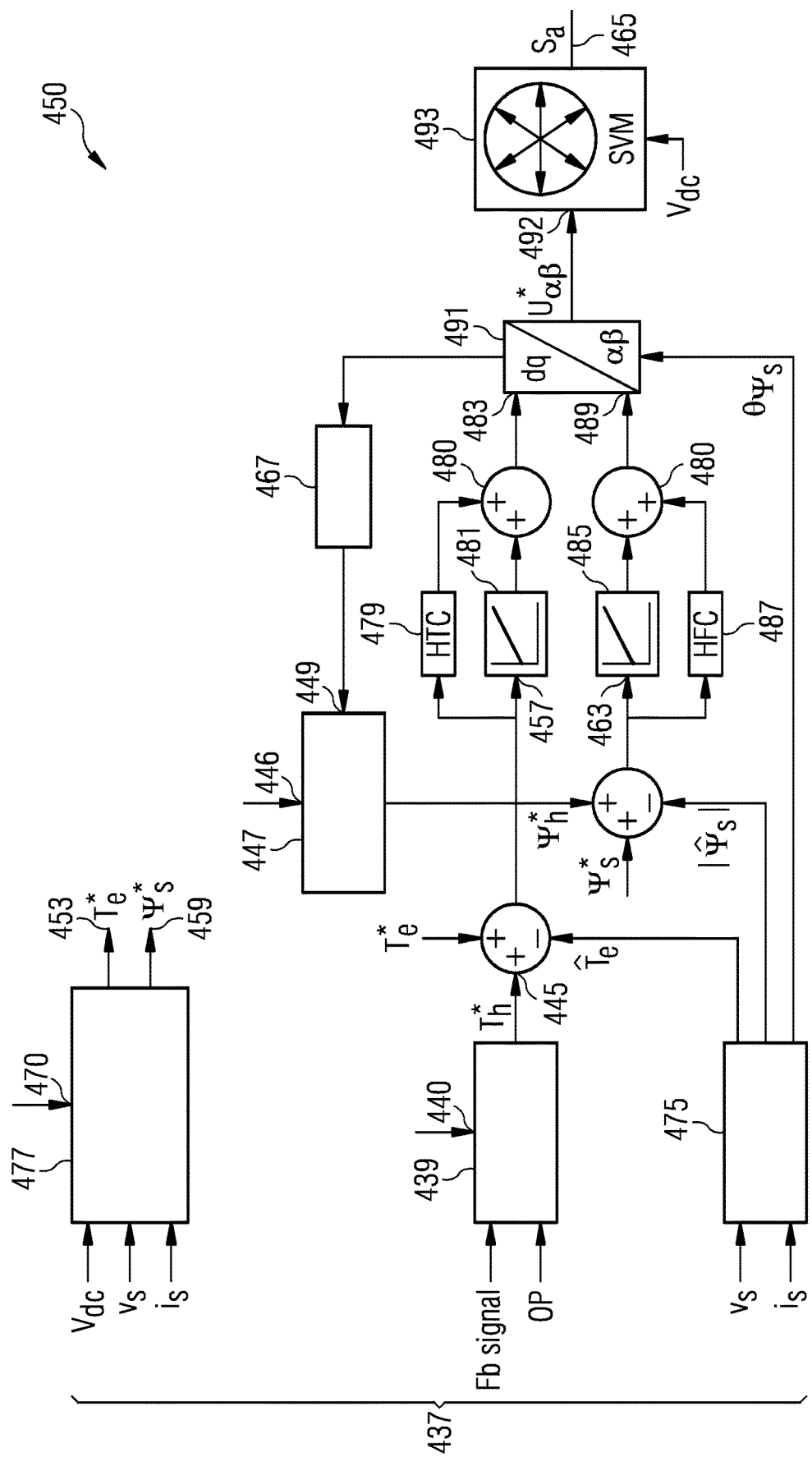

FIG. 2 schematically illustrates an arrangement 250 for controlling a generator side converter portion and FIGS. 3 and 4 illustrate respective embodiments 350, 450 of the arrangement for controlling a generator side converter portion.

The inputs to the arrangement 250 are collectively denoted with reference sign 237. The arrangement 250 comprises a torque ripple controller (TRC) 239 which receives as inputs a feedback signal 241 and/or an optional signal 243 indicating the operating point. The torque ripple controller 239 derives therefrom a harmonic torque reference 245 (Th*).

The arrangement 250 further comprises a harmonic voltage controller (HVC) 247 which receives as input a stator voltage indicating feedback signal 249 and derives therefrom a harmonic flux reference 251 ($\psi h^*$).

The torque ripple controller 239 and the harmonic voltage controller 247 operate on a particular harmonic of a fundamental frequency. If more than one harmonic of the fundamental frequency are to be treated, for each harmonic, a respective torque ripple controller 239 and a respective harmonic voltage controller 247 may be provided. In case of several harmonics to be treated, all of the harmonic torque references 245 are added at an addition element 254 to a fundamental torque reference 253 (Te*) and an estimated generator torque 255 is subtracted to derive a torque error 257. All of the harmonic flux references 251 are added at an addition element 254 to a fundamental flux reference 259 ($\psi s^*$) and an estimated generator flux 261 is subtracted to derive a flux error 263. The desired flux change $d\psi$ and desired torque change dTe are obtained as output of the hysteresis controllers 268, 269.

A converter control signal 265 is derived based on the desired torque change dTe and the desired flux change $d\psi$. Thereby, the converter control signal 265 represents a switching state signal defining a switching state of plural controllable switches of the generator side converter portion 121 (illustrated in FIG. 1).

The stator voltage indicating feedback signal 249 is derived from a measured DC link voltage Vdc and the switching states 265 using a calculation module 267. The calculated stator voltage may be bandpass-filtered to eliminate harmonics different from the harmonic the harmonic voltage controller 247 is working on. According to the embodiment 250 illustrated in FIG. 2, the torque error 257 and the flux error 263 are supplied to respective hysteresis controllers 268, 269 whose outputs, the desired flux change dψ and desired torque change dTe, are supplied to a switching table 271 that outputs the switching state 265. Furthermore, the switching table 271 receives the stator flux position Θψs (273) and derives the switching states 265 also based on the stator flux position 273. The estimated generator torque 255 and the estimated generator flux 261 are derived by a torque and flux estimator 275 based on the stator voltage vs, in particular reference stator voltage, and stator current is.

The fundamental torque reference 253 and the fundamental flux reference 259 are derived by a fundamental torque/flux reference calculation module 277 based on one or several of the following quantities: stator voltage 'vs', stator current 'is' and DC link voltage Vdc. As can be taken from FIG. 2, the harmonic torque reference 245 (Th*) is derived by the torque ripple controller 239 further based on an operating point 243 of the generator 111.

The arrangements 350, 450 illustrated in FIGS. 3 and 4 comprise modules similar or identical to modules of the arrangement 250 illustrated in FIG. 2 which modules are labelled with reference signs differing only in the first digit. However, the arrangement 350 for controlling a generator side converter portion according to an embodiment of the present invention does not comprise the hysteresis controllers 268, 269 and the switching table 271 but instead comprises a predictive torque controller 377 which receives the torque error 357 and the flux error 363 and derives therefrom the converter control signal 365.

Instead of the predictive torque control 377 or the hysteresis controllers 268, 269 and the switching table 271, the arrangement 450 illustrated in FIG. 4 comprises a harmonic torque controller 479 and a fundamental torque controller 481 to which the torque error 457 is supplied and the outputs are added together using the addition element 480 to derive a first voltage reference 483. Furthermore, the arrangement 450 comprises a fundamental flux controller 485 and a harmonic flux controller 487 to which the flux error 463 is supplied and whose outputs are added by an addition element 480 to arrive at a second voltage reference 489. The first voltage reference 483 and the second voltage reference 489 are supplied to a dq-αβ-transformation module 491 that outputs a total voltage reference 492 uab*. The total voltage reference 492 is supplied to a space vector modulation module 493 which derives therefrom the switching state 465. As can be taken from FIG. 4, the stator voltage indicating feedback signal 449 is derived by the module 467 based on the total voltage reference.

The harmonic torque controller 479 in FIG. 4 and the torque ripple controller 239, 339, 439 in FIGS. 2, 3, 4 are distinct controllers, but they may have the same structure (such as any of FIGS. 5-7) in case suitable feedback signal are available. However, in case feedback signal is not available for torque ripple controller, it can be a look-up table having the operating point (OP) as input.

The torque controller 481 and the flux controller 485 in FIG. 4) may be PI controllers for fundamental torque and flux.

The converter control signal in FIG. 4 is derived based on the inputs to the transformation module dq/αβ by Inverse Park transformation plus voltage modulator.

High performance harmonic control in an electric drive is important as this is a requirement for permanent magnet generators for several reasons: (1) meet noise standards; (2) prevent excitation of structural modes and accelerated fatigue; (3) optimized DC link voltage usage and system efficiency. The torque ripple controller (TRC) illustrated in FIGS. 2, 3 and 4 generates the harmonic torque reference (Th*) which is added to the fundamental torque reference (Te*), modifying the reference torque to contain the errors in the estimated torque at the harmonic frequencies of concern. The harmonic voltage controller (HVC) illustrated in FIGS. 2, 3 and 4 generates a harmonic flux reference to minimize the respective harmonic voltage.

Direct torque control merits are expected to be retained for the TRC and HVC, namely fast dynamics due to a decoupled control of torque and flux/voltage. Moreover, the simplicity of implementation of the LUT-based approach is obvious from FIG. 2, since the inner flux and torque controller (hysteresis controllers 268, 269) provide high bandwidth control without the need for additional controllers in parallel.

The arrangement 350 illustrated in FIG. 3 is another attractive solution including the predictive torque control (PTC) method which is endowed with high bandwidth flux and torque control like the LUT-based DTC (inner loop composed of blocks for model-based prediction and cost function minimization). In FIG. 4, the TRC and HVC are integrated into the direct torque control with space vector modulation. As opposed to the embodiments illustrated in FIGS. 2 and 3, in FIG. 4, voltage references are readily available at the modulator input, namely at the signal 492, but the lower bandwidth of torque and flux controllers may require additional parallel controllers (HTC and HFC in FIG. 4) for achieving high performance reference tracking of harmonic content and zero steady-state errors. Some of the approaches may be resonant controllers and PI controllers in multiple reference frames.

The calculation of Vrms for the illustrated control method is as follows: $Vrms=sqrt(Vd\hat{\ }+Vq\hat{\ }2)$ or $Vrms=sqrt(V\alpha\hat{\ }2+V\beta\hat{\ }2)$. Vdq are readily available (sum of torque/flux controllers' outputs) in DTC-SVM, whereas for DTC-LUT voltages are reconstructed using switching states (Sabc) and dc-link voltage (Vdc):

$$\begin{cases} u_{c\alpha} = \frac{2}{3}V_{dc}\left(S_a - \frac{S_b + S_c}{2}\right) \\ u_{c\beta} = \frac{1}{\sqrt{3}}V_{de}(S_b - S_c) \end{cases}$$

The harmonic of interest is extracted from Vrms by an adaptive BPF at the selected harmonic. It is emphasized that embodiments focus on the outer harmonic control loops shown in FIGS. 2, 3, 4 as TRC and HVC, which modify the reference torque and flux required by any DTC based control method. Accordingly, the different examples presented in FIGS. 2, 3, 4 (LUT, predictive, SVM) are given for the sake of completeness. However, fast inner control loops may be achieved in other manners.

Figure 5:
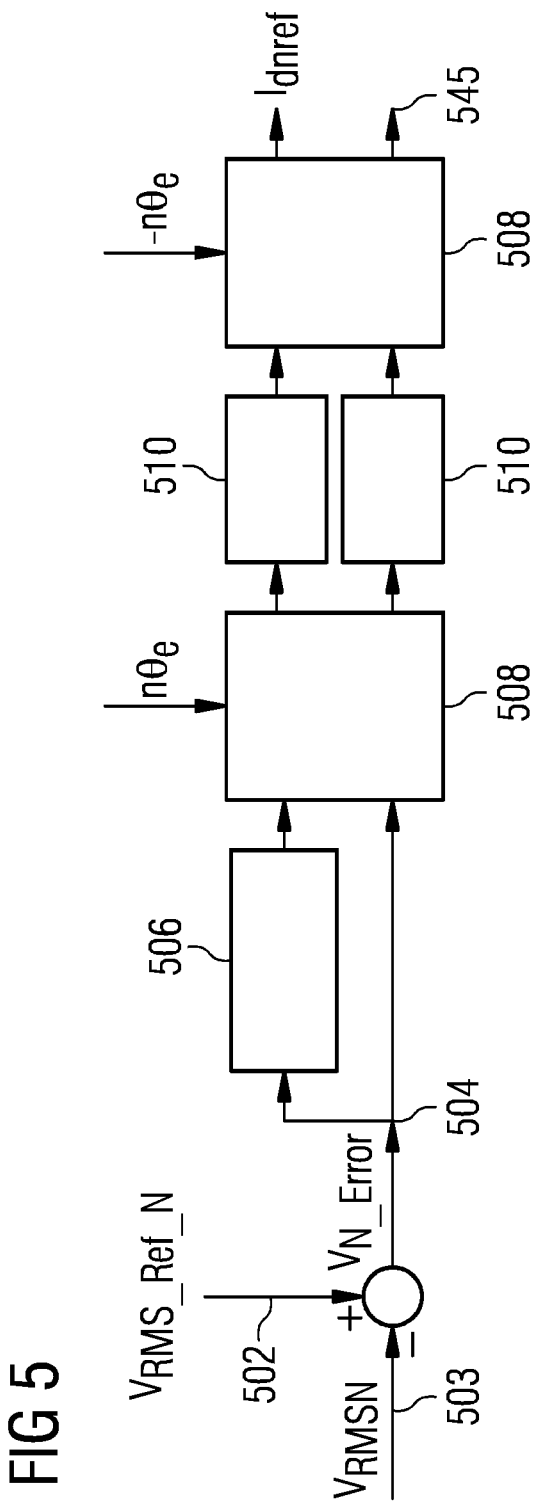
FIG. 5 illustrates an implementation of harmonic controllers which may be employed in the arrangements illustrated in FIGS. 2 to 4.
Figure 6:
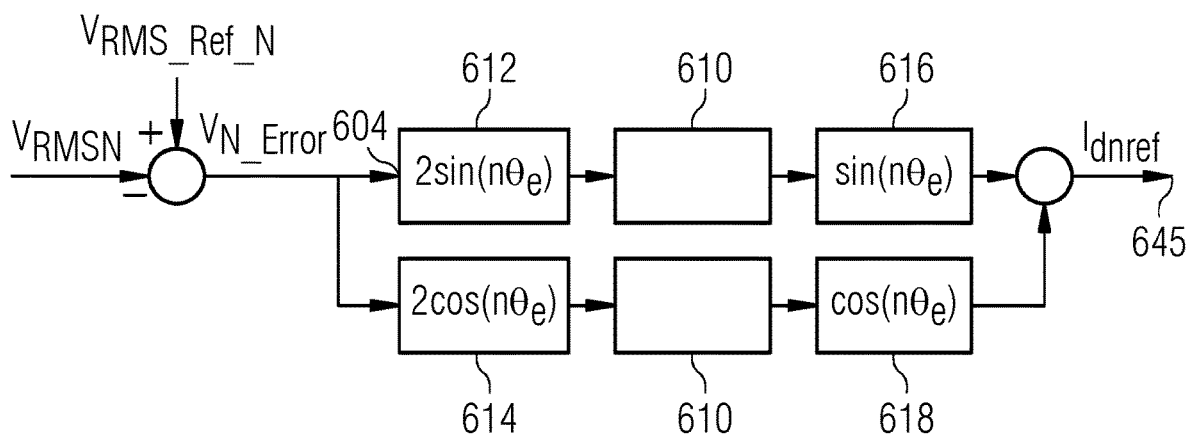
FIG. 6 illustrates an implementation of harmonic controllers which may be employed in the arrangements illustrated in FIGS. 2 to 4.
Figure 7:
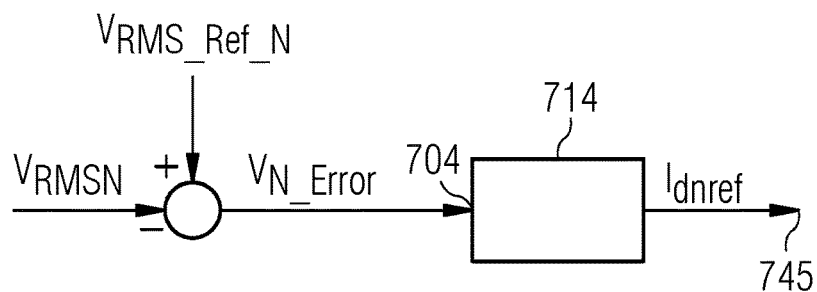
FIG. 7 illustrates an implementation of harmonic controllers which may be employed in the arrangements illustrated in FIGS. 2 to 4.

FIGS. 5, 6 and 7 illustrate harmonic controllers as implementations of the control blocks HVC, TRC, HTC, HFC illustrated in FIGS. 2,3 and 4.

In particular, the torque ripple controllers 239, 339, 439 illustrated in FIGS. 2, 3, 4 may receive a harmonic torque demand signal 240, 340, 440, respectively, representing the desired torque at the harmonic at consideration. This harmonic torque demand may for example be zero. Similarly, the harmonic voltage controller may receive as an input a harmonic voltage demand signal 246, 346, 446 in FIGS. 2, 3, 4, respectively. This signal may represent a harmonic voltage demand, and this may be zero according to different applications.

In all the implementations of the controller illustrated in FIGS. 5, 6 and 7, a harmonic error 504 is calculated from the demand harmonic value 502 and a feedback signal 503. In the implementation illustrated in FIG. 5, the error 504 is 90° shifted by a 90° phase-shifter 506 and the output signal is supplied to a frame transformation module 508. The frame transformation module 508 transforms the error and the 90° shifted error according to a coordinate system rotating with the considered harmonic. The output is supplied to PI regulators 510 which derive an output signal such that the error reduces to zero. Downstream the regulators 510, a further frame transformation module is arranged which back-transforms to obtain harmonic reference 545.

In FIG. 6, the harmonic error 604 is supplied to trigonometric function 612, 614 and the output is again supplied to PI regulators 610 whose output is multiplied with another trigonometric functions 616, 618 and added together to obtain the harmonic reference 645.

In the implementation illustrated in FIG. 7, the harmonic error 704 is supplied to a resonant regulator 714, to obtain the harmonic reference 745.

Control blocks HVC, TRC, HTC, HFC in FIGS. 2, 3, 4 can all be implemented similarly and are next called harmonic controllers. Different options of harmonic controllers are shown in FIG. 5, 6, 7. In all options, the harmonic error is calculated, and a close loop regulation is made. Thus, the regulators are used to control harmonic error to 0. The harmonic regulator based on vector control principle is shown in FIGS. 5, 6, enabling the implementation of simple PI controllers. FIG. 7 shows the harmonic regulator using resonant regulator with a typical transfer function as below, where f1 is the resonant frequency and ξ1 is the damping of the controller. The block diagrams shown in FIGS. 5, 6, 7 assume that adaptive band-pass filters (BPF) are applied to reference/feedback signals whenever needed and therefore only the harmonic order of interest is given to the controller input. Alternatively, BPFs may be implemented in the harmonic error (Vn_error) in FIGS. 5, 6 and 7.

$$RR(s) = k_p + k_i \frac{4\pi f_1 \xi_1 S}{s^2 + 4\pi f_1 \xi_1 s + (2\pi f_1)^2}$$

Application to PM machines may allow to reduced noise and vibration and also to optimize hardware utilization. Noise and vibration reduction by minimization of torque ripple may be straight forward to understand.

On the other hand, increasing hardware usage by control of harmonic stator voltage/flux may not be so obvious. The latter is explained by the fact that in the presence of non-negligible voltage harmonics, a reduced (average) flux reference may need to be set to avoid converter overmodulation, resulting in entering the flux-weakening region at a lower speed level and operating with increased phase currents. The introduction of HVC enables the following possibilities: (1) increase of average stator flux reference; or (2) reduction of dc-link voltage. In other words, HVC allows to extend the operating range on MTPA (Maximum Torque Per Ampere), narrowing the flux weakening range, and therefore optimizing drive efficiency.

One of the main advantages of the proposed control structure and respective feedback signals may be that the dependence on the accuracy of flux and torque estimators is eliminated with regards to harmonic control.

It is to be noted that the input of TRC may not be limited to an accelerometer, and other signals such as microphone and different sensors may be options. Moreover, the closed-loop harmonic controller TRC may be replaced by a simple LUT with operating point (OP) information as input such as speed and torque, providing a cheap feed-forward solution.

FIG. 8 illustrates simulation results of the modified space vector modulator based direct torque control as is illustrated in FIG. 4. The control of the PM generator is accomplished by implementing a DC link voltage controller for calculation of the fundamental torque reference (Te*) and a flux weakening control for calculation of the fundamental stator flux reference (also called fundamental voltage controller, since it targets to keep the generator voltage below a given limit). Regarding harmonic control, measured or inferred torque ripple is used as feedback signal together with the controller in FIG. 5 for the torque ripple controller and the harmonic voltage control uses voltage ripple in Vrms as input and a controller structure as in FIG. 5.

The abscissas 816 denote the time and the ordinates 818 the strength of the signal. The curve 820 illustrates the feedback torque, the curve 822 illustrates the estimated torque, the curve 824 depicts the modulation index and the curve 826 indicates the estimated flux. The torque ripple controller is enabled at the time point t=3 s, i.e., at the time point 828. Thus, it results in an effective reduction of the measured torque ripple (remaining oscillations are at a non-controlled lower harmonic frequency), whereas a sixth harmonic is imposed in the estimated/referenced torque. The harmonic voltage control is enabled at the time point 830, i.e., at t=5 s, reducing the voltage ripple by imposing a sixth harmonic in the reference flux. Accordingly, the converter operates further from the flux weakening and/or overmodulation regions.

According to an embodiment of the present invention, the fundamental references for the current/torque/flux are calculated by controllers or look-up tables, some examples are speed, power, torque, flux, voltage controllers and maximum torque per ampere methods. Such controllers provide Te* and ψs* which are usually DC signals during steady state operation.

The torque ripple controller targets to control torque ripple by using a suitable sensor as feedback signal and generating a reference harmonic torque Th* which is a sinusoidal signal varying at a given frequency or a combination of sinusoidal signals with different frequencies. It may be composed of a variety of controllers (PI, search algorithms, etc.) and/or LUTs.

The harmonic voltage controller targets to control voltage ripple by using the modulus of the reference voltage (Vrms) as feedback and generating a reference harmonic flux ψh* which is a sinusoidal signal varying at given frequencies or a combination of sinusoidal signals with different frequencies. It may be composed of a variety of controllers.

The torque/flux controller may comprise PI controllers with given bandwidth, aiming to track DC content of torque and flux references.

The harmonic torque/flux controller (HTC and HFC) may be controllers implemented by PI controllers in the harmonic reference frame, proportional-resonant controllers or any other suitable methods.

Park transformation may transform between stationary frame ($\alpha\beta$) and synchronous rotating frame (dq) and vice versa. Similar techniques may be applied for transformations between synchronous rotating frame and harmonic reference frame.

Voltage modulator uses the reference voltages in the stationary frame for generating PWM (pulse width modulation) pattern. The PWM signals are used to control power electronic switches such as IGBT in the generator side converter portion. Hysteresis (bang-bang controller) may be considered as controllers used to define LUT entries in DTC-LUT, 2 and/or 3 level controllers are typically used. Controllers output determine if torque/flux is to increase, decrease or remain unchanged.

Switching table determines the optimized voltage according to the desired action stated at the LUT entries by the hysteresis controllers. Stator flux angle is also an entry of the LUT, defining a given number of sectors.

Torque and flux estimators may employ machine models together with current measurements to estimate electromagnetic torque and stator flux. Reference voltages are typically used instead of measured voltages. A variety of models and observer structures may be used for estimation purposes.

Embodiments of the present invention may provide a control method for incorporating harmonic control capability in direct torque control drives. The harmonic control may include torque ripple control and voltage ripple control. A control method for improving harmonic control performance in electrical drives may be provided. The harmonic control may have little dependency on the accuracy of torque ripple and flux linkage ripple estimation and thus may have a good robustness. A control method may be well suited for the control of the permanent magnet generators for wind turbines which may provide an alternative to the more commonly employed vector control methods. Embodiments of the present invention may reduce noise and vibration and increasing voltage control range and drive efficiency. A control method suitable for implementation in the controller of a frequency converter may be provided.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of generating a converter control signal for a generator side converter portion being coupled to a generator, the method comprising:
   deriving at least one harmonic torque reference based on a harmonic torque demand and a torque indicating feedback signal;
   deriving at least one harmonic flux reference based on a harmonic stator voltage demand and a stator voltage indicating feedback signal;
   adding all of the at least one harmonic torque reference to a fundamental torque reference and subtracting an estimated generator torque to derive a torque error;
   adding all of the at least one harmonic flux reference to a fundamental flux reference and subtracting an estimated generator flux to derive a flux error; and
   deriving the converter control signal based on the torque error and the flux error.

2. The method according to claim 1, wherein the converter control signal represents a switching state signal defining a switching state of controllable switches of the generator side converter portion.

3. The method according to claim 1, wherein the stator voltage indicating feedback signal is derived from a measured DC-link voltage and the switching state by applying an adaptive band pass filter tuned to the harmonic at interest.

4. The method according to claim 1, wherein the torque error and the flux error are supplied to respective hysteresis controllers whose outputs are supplied to a switching table that outputs the switching state, further wherein the switching table outputs the switching state further based on a stator flux position.

5. The method according to claim 1, wherein the torque error and the flux error are both supplied to a predictive torque control, including model-based prediction and cost function minimization, that derives the switching state.

6. The method according to claim 1, wherein the torque error is supplied to a torque controller, and also to a harmonic torque controller in parallel, operating in one or more reference frames, which derives a first voltage reference, further wherein the flux error is supplied to a flux controller, and also to a harmonic flux controller in parallel, operating in one or more reference frames, which derives a second voltage reference, further wherein the converter control signal is derived based on the first voltage reference and the second voltage reference.

7. The method according to claim 6, wherein the first voltage reference and the second voltage reference are both supplied to a dq-$\alpha\beta$-transformation module that outputs a total voltage reference, further wherein the voltage reference is supplied to a space vector modulator that derives the switching state signal.

8. The method according to claim 7, wherein the stator voltage indicating feedback signal is derived from the total voltage reference.

9. The method according to claim 1, wherein the estimated generator torque and the estimated generator flux are derived based on the stator voltage.

10. The method according to claim 1, wherein the fundamental torque reference and the fundamental flux reference are derived based on the stator voltage, and DC-link voltage.

11. The method according to claim 1, wherein the torque indicating feedback signal comprises a sensor measurement signal obtained by an accelerometer or a torque sensor or a microphone.

12. The method according to claim 1, wherein the harmonic torque reference is derived further based on an operating point of the generator, the operating point defining rotational speed and torque.

13. A method of controlling at least one generator side converter portion of at least one wind turbine, being coupled to at least one generator, the method comprising:
   performing the method of generating a converter control signal according to claim 1; and
   supplying the converter control signal to the generator side converter portion.

14. An arrangement for controlling a generator side converter portion, being coupled to a generator, the arrangement being adapted to carry out the method according to claim 1.

15. A power generation system, comprising:
at least one generator;
at least one converter comprising a generator side converter portion, a DC-link and a utility grid converter portion, the generator side converter portion being coupled to the generator; and
at least one arrangement according to claim 14.

* * * * *